United States Patent
Schneider

(10) Patent No.: US 8,422,784 B2
(45) Date of Patent: Apr. 16, 2013

(54) METHOD FOR THE IMAGE COMPRESSION OF AN IMAGE COMPRISING 3D GRAPHICS INFORMATION

(75) Inventor: Robert Schneider, Rosstal (DE)

(73) Assignee: Siemens Aktiengesellschaft, Munich (DE)

( * ) Notice: Subject to any disclaimer, the term of this patent is extended or adjusted under 35 U.S.C. 154(b) by 1127 days.

(21) Appl. No.: 12/320,040

(22) Filed: Jan. 15, 2009

(65) Prior Publication Data
US 2009/0185750 A1    Jul. 23, 2009

(30) Foreign Application Priority Data
Jan. 23, 2008  (DE) .................. 10 2008 005 476

(51) Int. Cl.
*G06K 9/00*    (2006.01)

(52) U.S. Cl.
USPC ............................................ 382/173

(58) Field of Classification Search .......... 382/162–167, 382/173, 181, 232–233, 243, 254, 282, 284, 382/305; 715/700; 345/418–420, 581–583, 345/589–593, 619, 629–630, 522; 358/538–540, 358/452–453, 462
See application file for complete search history.

(56) References Cited

U.S. PATENT DOCUMENTS

| | | | | |
|---|---|---|---|---|
| 6,593,925 | B1 * | 7/2003 | Hakura et al. | 345/426 |
| 6,999,100 | B1 * | 2/2006 | Leather et al. | 345/611 |
| 7,016,547 | B1 * | 3/2006 | Smirnov | 382/245 |
| 7,551,182 | B2 * | 6/2009 | Bethune et al. | 345/619 |

OTHER PUBLICATIONS

Charilaos Christopoulos et al. "The JPEG2000 Still Image Coding System: An Overview"; IEEE Transactions on Consumer Electronics, vol. 46, No. 4, pp. 1103-1127, Nov. 2000; Others; 2000; US.
Xu-Cheng Yin at al, Financial Document Image Coding with Regions of Interest Using JPEG2000, IEEE, Proceedings of the 2005 Eight International Conference on Document Analysis and Recognition (ICDAR'05): 2005; US.
A.G. Morgan, Rendering with Layers in LightWave 3D, archived Nov. 10, 2006 http://web.archive.org/web/20061110034651/http://www.survivorsdiary.com/Passes/layers.html; 5 p.
Farhez Rayani, Rendering—Maya Version 7, Alias Systems, Copyright 1997-2005, p. 1-18, http://library.sit.ac.nz/pdf/GraphicDesign/Maya7/maya%20pdf/Complete/Rendering_Maya_7.pdf; Toronto, CA.

* cited by examiner

*Primary Examiner* — Jose Couso
(74) *Attorney, Agent, or Firm* — Harness, Dickey & Pierce, PLC

(57) ABSTRACT

An embodiment of a method is disclosed for compressing digital images which can be displayed by a graphics card. An embodiment of the method includes providing an image by the graphics card; marking out a foreground region in the image provided on the basis of depth information provided in the graphics card; compressing the marked-out foreground region; simplifying the image by smoothing the foreground region marked out in the image; and separately compressing the simplified image.

17 Claims, 2 Drawing Sheets

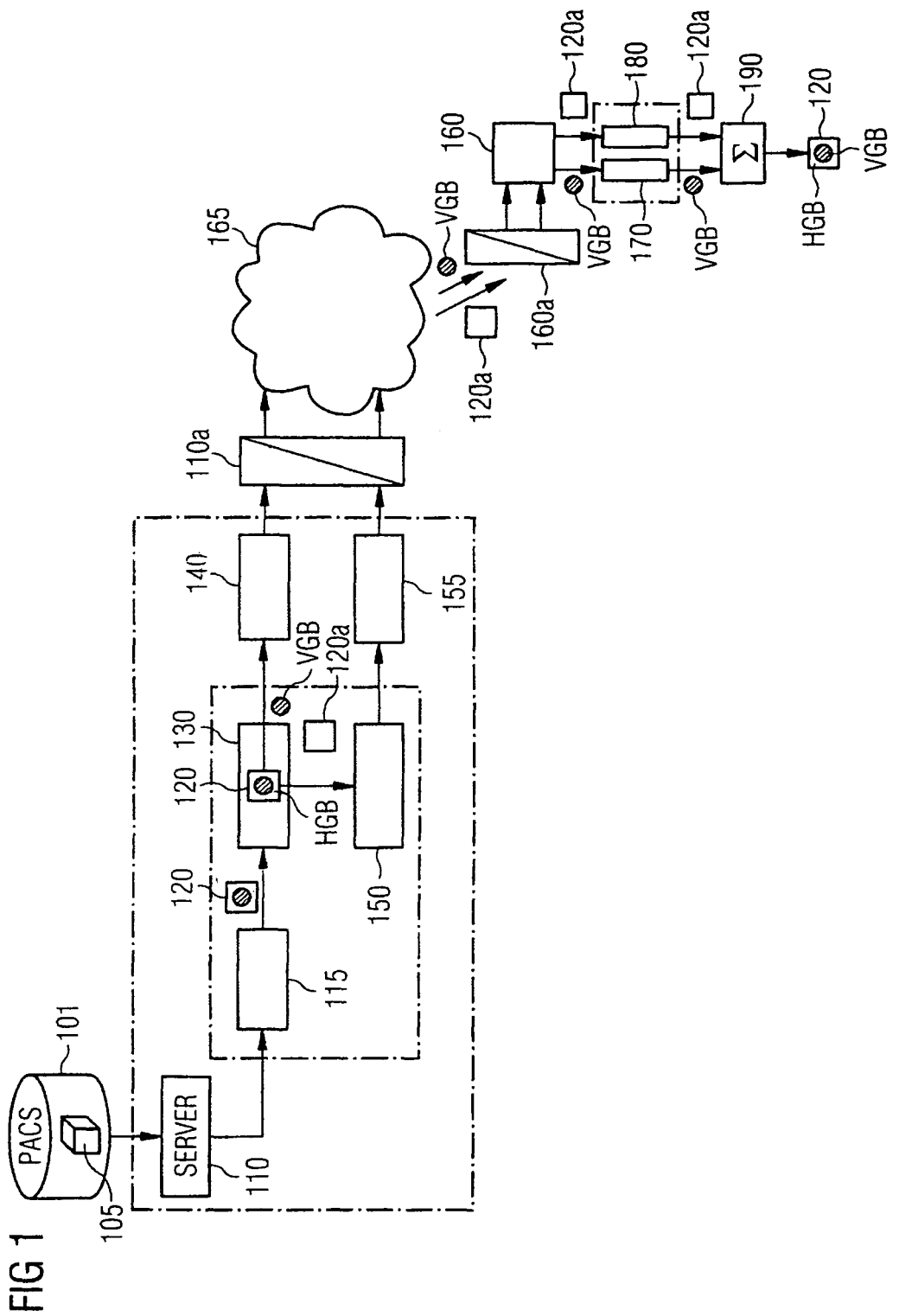

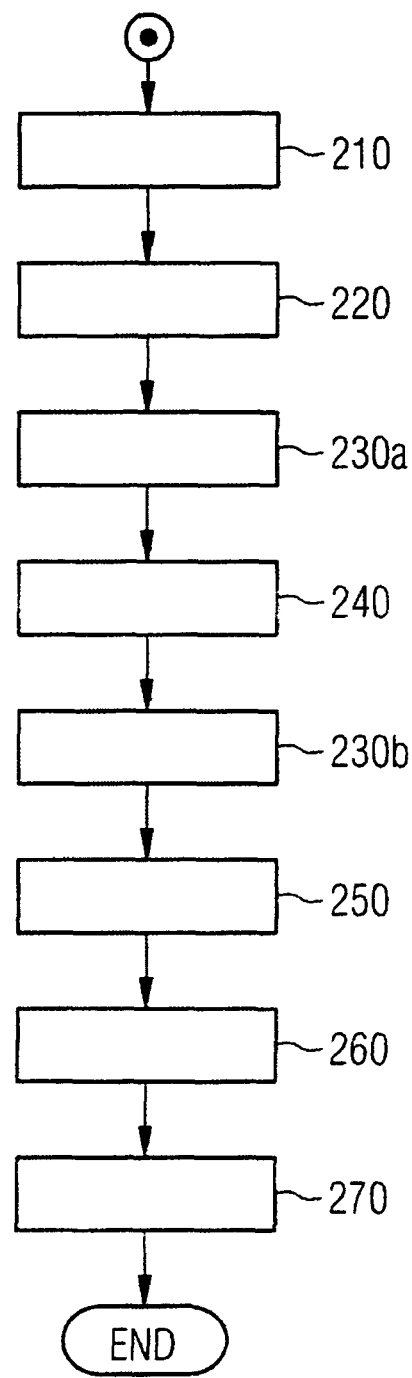

METHOD FOR THE IMAGE COMPRESSION OF AN IMAGE COMPRISING 3D GRAPHICS INFORMATION

PRIORITY STATEMENT

The present application hereby claims priority under 35 U.S.C. §119 on German patent application number DE 10 2008 005 476.3 filed Jan. 23, 2008, the entire contents of which is hereby incorporated herein by reference.

FIELD

Embodiments of the invention are generally in the field of medical technology and generally relate to the processing of medical image material.

BACKGROUND

The development of modern imaging techniques in addition to the implementing hardware to carry them out have provided the medically schooled eye of the medical practitioner with new diagnostic possibilities for the medical practitioner.

In medical technology, the imaging-implementing hardware is also referred to as a modality and it also comprises a large number of tomographs, such as CT, PET or MRI, in addition to the classical X-ray equipment. These modalities acquire a large number of highly-resolved slice images of the patient, all of which are subsequently available as three-dimensional (3D) image data blocks for further examination. The 3D image data blocks require a lot of storage space and are therefore maintained centrally for diagnostic purposes in database systems such as PACS.

Using modern rendering methods such as VRT (volume rendering technique), MIP (maximum intensity projection) or SSD (surface shaded display), a number of two-dimensional images having visual (e.g. color) embodiments which assist the diagnosis are generated from the 3D image data blocks by way of a projection in a desired direction and are then made available to the medical practitioner for diagnostic purposes.

By way of example, these two-dimensional (2D) images are then examined by the medical practitioner in an advantageous arrangement or sequence on the basis of a hanging protocol, or the images are displayed in a continuously refreshed state by means of an animation or user interaction. For example, an operation by which the medical practitioner can examine an organ from different perspectives is feasible. Each perspective is illustrated by one image of the organ and a new perspective of the organ is loaded as a new image by a mouse click, for example. The quality of the 2D images, that is to say the resolution and the color fidelity are of the utmost importance for a reliable diagnosis.

The modalities are generally integrated as central nodes into a medical communication network, such as a hospital intranet or supra-regional or supranational networks (internet), and from these nodes the images can be transmitted to the enquiring nodes (clients).

Integrating the modalities as central nodes is necessary because the modalities are very expensive infrastructures. For example, not every practice or even every hospital can afford its own CT.

Implementing the rendering method to generate the 2D images from the 3D image bock is also very intensive computationally and for this reason it is also in part implemented centrally by specialized high-performance computers.

Centralizing the modalities or the central provision of the three-dimensional image data, for example by a PACS, in the network then results in the following practical application scenario for the medical practitioner: by means of the client and the network, the medical practitioner will request a specific rendering method for the images from the 3D image data block which suits the particular diagnostic procedure. The previously acquired 3D image data block of the patient to be examined is then made available via PACS and is rendered by the central graphics computer. The multiplicity of 2D images generated in this fashion are then transmitted to the enquiring client.

However, since the medical practitioner also wishes to use the rendered 2D images for emergency diagnoses for example, and/or because these images have to be made available to medical practitioners at a multiplicity of widely distributed nodes in the communication network, for example within the scope of a medical teleconference, the fast transmission of the qualitatively high-grade 2D images to the clients or nodes is of enormous importance.

Although the rendered 2D images are slices of the memory-intensive 3D image data block, they generally still are memory intensive, so compression methods have to be applied for a high throughput rate when transmitted over the network. However, the above-described functionality of the user interaction to display different perspectives, for example, which requires a multiplicity of 2D images to be transmitted as frames in possibly short time intervals, may also be memory-intensive as a result of high data traffic.

However, this results in the problem of artifacts being generated in these 2D images when, in particular, lossy compression methods are used, in particular if the 2D images also have a proportion of 3D graphics elements such as lines, text, meshes, etc. However, these artifacts can be extremely detrimental to the quality of the images and can, as a worst case scenario, lead to false diagnoses.

If these graphics components in the 2D images are only overlay graphics, the problem can be circumvented for example by compressing and transmitting the graphics components separately from the 2D images and only combining them at the target node.

However, if they are not overlay graphics, i.e. if the graphics elements are directly embedded in the 2D image or covered, then this is not possible, and so the application of an arbitrary lossy compression method inevitably results in the mentioned artifacts.

The prior art discloses a number of storage and compression methods, such as DjVu, which are able to isolate the graphics elements by complex pattern and image recognition routines so that the image to be compressed is decomposed into foreground and background components, and these can then be compressed separately. Foreground and background components of the image are then compressed separately and recombined at the target node after transmission and decompression.

The disadvantage of intelligent compression methods such as DjVu is that they are quite complex algorithms, the implementation of which is computationally intensive and requires a lot of time. Quick transmission of images, which is often required in a medical scenario, is not possible using such compression methods if artifact formation is to be circumvented.

Thus, in principle there are three options for avoiding the "artifact problem" when transmitting images in a server-client scenario: there is no lossy transmission of the images, i.e. a very low compression rate is utilized; however, a problem associated with this is that only very low throughput rates can be achieved. Another possibility is to do without images with 3D graphics components as a matter of principle; however, this is paid for by the disadvantage that the visualization option required for diagnosis cannot be fully utilized, which is unacceptable, particularly in the medical field. A third possibility of course lies in accepting artifact formation, but in certain circumstances this can lead to false diagnoses when interpreting the images.

SUMMARY

In at least one embodiment of the invention, a way is shown by which images with 3D graphics components can be compressed with a sufficient compression rate such that it is possible to achieve a high throughput with a low network load in the case of transmission to a target node over a network. At the same time, the formation of artifacts after image decompression should be avoided, and it should be possible to effect compression particularly quickly to be able to ensure the basis for interactive functionalities at the target node.

Embodiments of the invention are directed to a method, a system, a graphics card and a computer program product.

In the following text, at least one embodiment of the invention will be described on the basis of the solution in accordance with the method. Advantages, features or alternative embodiments mentioned in this case should also be transferred to the other claimed subjects, in particular to the claimed system, apparatus and to the product. In other words, the above-mentioned claimed subjects can be developed by features which are described and/or claimed in connection with the method, and vice versa.

In at least one embodiment, a method for compressing digital images which can be displayed by a graphics card, the method comprising:
  providing an image by the graphics card;
  marking out a foreground region in the image provided;
  compressing the marked-out foreground region;
  simplifying the image by smoothing the foreground region marked out in the image;
  separately compressing the simplified image,
wherein the foreground region is marked out on the basis of depth information provided in the graphics card.

In the following text, the terminology of the concepts used in embodiments of the present invention is intended to be described briefly.

In this context, the graphics card is primarily understood to be a massively parallel working hardware module which is capable of generating the digital images by use of different rendering methods.

Digital images are 2D image data generated by the rendering method of at least one embodiment and comprise 3D graphics elements, such as text, lines or meshes, which were embedded in the image by the rendering method of at least one embodiment.

Providing in this case refers to the rendering process of the graphics card, in particular the individual rendering passes in which the 3D graphics elements are rendered. In this context, it is not necessary to display the image on a monitor on the client.

Marking out refers to a process based on a "pixel-by-pixel" basis, by which the rendered image is decomposed into two quantities of pixels: specifically, it is decomposed into the foreground region and a quantity complementary to it, namely the background region.

Compressing is understood to mean the application of conventional compression methods, in which, in accordance with one aspect of at least one embodiment of the invention, the marked-out foreground region is compressed losslessly.

Simplifying the image, according to at least one embodiment of the invention, refers to the application of conventional smoothing methods to the marked-out foreground region in the image. Color information assigned to individual pixels in the marked-out foreground region define a color gradient signal in the foreground region, with large frequency differences in the color gradient signal being smoothed by the smoothing method. By way of example, this can be effected by assuming a harmonic color gradient starting from the pixels in the complementary region of the foreground region, i.e. the background region. Numerically, this assumption manifests itself as a Dirichlet problem and can be solved by applying standard numerical methods such as discretizing the associated differential equations/differential operators.

According to at least one embodiment of the invention, a multigrid method is used in this context in order to obtain fast convergence rates. In principle, other suitable methods, such as the conjugate gradient method, are also feasible.

According to at least one embodiment of the invention, it suffices to terminate the iteration after a few steps. A complete solution of the Dirichlet problem is not required for the purposes of the invention.

However, different smoothing methods may also be used. All that needs to be ensured is that, in the foreground region, large variations in the color gradient signal are eliminated so that the image simplified in this fashion can also be compressed with a high compression rate without artifacts being generated during the decompression. Separate compression of the simplified image, having a high compression rate, and the foreground region, having a low compression rate, means that a high compression rate can be achieved overall and this makes fast transmission of the image possible.

Additionally, this results in the advantage that it is possible to avoid artifact formation in the reconstructed image when the image is reconstructed from the foreground region and from the simplified image by respectively decompressing and putting together or combining both parts. A simple, lossy compression of the image without deconstruction and smoothing would lead in part to strong artifact formation during the subsequent decompression, particularly in the regions of the image with the 3D graphics elements and this could be very detrimental to the quality of the image.

Depth information is understood to mean information defining a spatial depth of the 3D graphics elements in the image. According to at least one embodiment of the invention, this refers to the Z-values of the respective pixels in the image which are found in the Z-buffer during the rendering of the 3D graphics elements in the course of rendering the overall image. However, other suitable depth information, such as the $\alpha$ values in $\alpha$ compositing, may be used in accordance with other embodiments of the invention. The method according to at least one embodiment of the invention is particularly suitable for rendering methods, when the 3D graphics elements are rendered in a separate rendering step, before or after the remaining pixels are rendered in another rendering step, so that, for example, the Z-values in the Z-buffer can be used for the purposes of marking out the foreground region.

An advantage of using at least one embodiment of the method together with such rendering methods is that the depth information does not need to firstly be generated in an additional step because depth information is of course available in the course of such rendering methods.

According to at least one embodiment of the invention, the foreground region is marked out in two phases, with those pixels in the image which are assigned depth information (in particular the 3D graphics elements), e.g. a Z-value which does not change during the rendering, being acquired in the first phase. In the second phase, pixels are additionally selected from these acquired pixels on the basis of color information.

The color information is given by a sufficiently large difference of the color value of a pixel having a Z-value compared to the color values of the pixels neighboring this pixel.

Hence, according to at least one embodiment of the invention, color information and depth information are combined, with the selection based on depth information or color information—and changes of the same—being carried out in separate steps in accordance with one embodiment, and, in accordance with another embodiment, these two steps are combined into one step.

In accordance with another embodiment, a size (e.g. expressed by the number of pixels) of the foreground region to be marked out is dynamically adapted on the basis of the depth information or color information. According to at least one embodiment of the invention, the number of pixels which were acquired due to the depth information for example is counted in the process. If this number is small compared to a configurable limit value, then the pixels acquired in this fashion are directly considered to be the foreground region. However, if the number of the values is larger than the limit value, then, in an additional step, an edge region is defined around the pixels acquired in this fashion by way of an iterative method which takes the color information into account, and the edge region is taken to be the foreground region. The advantage of this is that when there is a lot of 3D graphics information in the original image, the marked-out foreground region can nevertheless be kept small.

According to at least one embodiment of the invention, the foreground region only has a low compression rate while the simplified image has a high compression rate, so that the thus obtained overall compression of the image is high enough for fast transmission, but artifact formation is nevertheless avoided during the subsequent decompression and combination of the foreground region and of the simplified image.

According to at least one embodiment of the invention, the pixel-by-pixel operation is parallelized so that the marking out can be implemented directly on the graphics card or on a module, such as a fragment shader, which communicates with the graphics card. The method according to at least one embodiment of the invention can be executed quickly by using the massive parallel capabilities of modern graphics cards.

In accordance with a further embodiment of the invention, the method also comprises the separate or simultaneous transmission of the compressed foreground region and of the simplified image to a receiver node which has submitted an enquiry regarding the image. In a further embodiment, the foreground region and the simplified image, received at the receiver node, are respectively decompressed and subsequently combined, for example by means of a simple superposition operation using a graphics card found at the receiver node.

BRIEF DESCRIPTION OF THE DRAWINGS

In the following detailed description of the figures, the features of example embodiments, which are not intended to be understood as limiting the invention, and the additional advantages are discussed with reference to the drawing, in which FIG. 1 is a schematic and overview-like illustration of the essential components in accordance with an example embodiment of the present invention, and FIG. 2 shows a flowchart which explains a usual temporal progression of method steps in accordance with an example embodiment of the invention.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The essential components of the system for transmitting compressed digital images over the network according to an embodiment of the invention are presented in the following text on the basis of FIG. 1.

FIG. 1 shows for example a PACS 101 on which a 3D image data block 105 is maintained for retrieval. The 3D image data block 105 is a number of slice images which were acquired from a patient by a modality such as a CT. A medical practitioner now requests, from a client 160 which is connected to a server 110 via a communication network 165 (e.g. hospital intranet or internet), a sequence of particular images 120 rendered to his specifications. In the following text, reference is only made to the image 120, although it is obvious that in general a number of images are requested which can then, for example, be combined on the client 160 to form an animation, for example, and thus assist the medical practitioner with the diagnosis.

The server 110 comprises a powerful graphics card 115. The server 110 now requests the 3D images data block 105 assigned to the patient from the PACS 101, with the graphics card 115 generating the image 120 on the basis of the 3D image data block 105 and a suitable rendering method.

According to an embodiment of the invention, the graphics card 115 comprises a foreground detector module 130 and a smoothing module 150. These two modules are implemented in the form of hardware and/or software and, according to the invention, are installed directly in the graphics card 115. In accordance with an alternative embodiment, it is of course also possible for these two modules to be external modules with respect to the graphics card 115.

On the basis of depth information, which accumulates during the rendering process by and on the graphics card 115, the foreground detector module 130 marks out a foreground region VGB in the generated image 120. This marking out is carried out on a pixel-by-pixel basis and can thus be implemented by a correspondingly programmed fragment shader, for example.

Marking out the foreground region VGB in the rendered image 120 effectively subdivides the image 120, with all those pixels which are not marked out as being part of the foreground region VGB being automatically considered to be part of a background region HGB. The foreground region VGB and background region HGB partition the image 120.

The marked-out foreground region VGB is copied out of the image 120 into a separate image file, for example, so that the positional specifications of the foreground pixels which generate the foreground region VGB are maintained with respect to the image 120 in order that the image 120 can be combined or reconstructed later.

According to an embodiment of the invention, the image file containing the foreground region VGB is subsequently compressed with a low, i.e. lossless, compression rate using a foreground region compression module 140 and it is subsequently transferred to the enquiring client 160 via a transmission interface 110*a* of the server 110 through the network 165.

Those pixels in the image 120 which were marked out as belonging to the foreground region VGB are simultaneously or subsequently smoothed by a smoothing module 150, starting from the background region HGB, in order to generate a simplified image 120*a* of the image 120. In this context, the image 120 can also be referred to as the original image.

According to an embodiment of the invention, the simplified image 120*a* is then compressed with a high, i.e. lossy, compression rate using a compression module 155. The thus obtained simplified image 120*a* having a high compression rate is subsequently transferred to the enquiring client 160 via the transmission interface 110*a* of the server 110 over the network 165.

Once the foreground region VGB, having a low compression rate, and the simplified image 120*a*, having a high compression rate, are received by the client 160 via a receiver interface 160*a* of the client 160, the simplified image 120*a* with high compression rate and the foreground region VGB are each decompressed using a corresponding decompression module 170, 180. This can also be a decompression module which can decompress data with both high and low compression rates.

Subsequently, the foreground region VGB and the simplified image 120*a* are put together or combined on the client 160 by means of a composition module 190, e.g. by superposition, so that the original image 120 which was originally rendered on the server 110 is once again obtained by reconstruction. For example, the graphics card 115 of the client 160, which communicates with the composition module 190, can effect the combination.

The system according to an embodiment of the invention for transmitting compressed images makes quick transmission of the image 120 with little load on the network 165 possible, with the image 120 received on the client 160 and combined there not having distracting artifacts. However, this precisely would be the case in conventional systems if the image 120 were to comprise 3D graphics or 3D graphics components and if the image 120 had undergone lossy compression using conventional compression methods. The interplay of the graphics card 115 with the foreground detector module 130 or the smoothing module 150 effectively avoids the formation of artifacts in the compressed combined image 120, but nevertheless, a compression rate of the overall image 120 which makes fast transmission possible is permitted by means of a high compression rate of the simplified image 120*a*. Since marking out and/or smoothing as a preparation phase for the two compressions can preferably be implemented directly on the graphics card 150 by way of vector operations, said preparation phase can be carried out very quickly.

The following text explains a conventional temporal progression of method steps in accordance with an example embodiment of the invention. Here, in particular the method step of marking out 220, which is implemented by the foreground detector module 130, and the method step of simplifying 240, which is implemented by the smoothing module 150, are discussed in detail.

First of all, in step 210, the image 120 is provided by the graphics card 115. Providing comprises rendering the image and in general runs over a number of passes if the rendering is carried out in accordance with a 3D-API, e.g. OpenGL or DirectX, which preferably is the case in the method according to an embodiment of the invention. The 3D graphics are rendered in the first pass, with those pixels which form the 3D graphics being assigned a so-called Z-value in the scope of Z-buffering and being buffered in a float texture on the graphics card. Pixels which are components of the 3D graphics can therefore be identified by their Z-value differing from an initial value (usually set to 1). In a further pass, all the remaining data forming the image 120 is rendered (e.g. using VRT, MIP or SSD), as a result of which the desired image 120 is generated.

Subsequently, the foreground region VGB is marked out in step 220, which evaluates the set of all Z-values, the latter being the depth information assigned to the respective pixels. First of all, the foreground detector module 130 acquires those pixels in step 220 which have a Z-value that differs from the initial value. This set of pixels is referred to as A1 for simplicity.

Moreover, the foreground detector module 130 registers which pixels of the set A1 did not change their Z-value during the transition from the first to the second pass. This is the set A2 (that is to say a subset of A1) and it forms the foreground region VGB in the simple case, i.e. where A2 has few pixels, as will be explained in more detail in the following text.

A pixel set A3 is now formed as a subset of the pixel set A2 by the foreground detector module 130 on the basis of the color information which is composed of the color channels and which is coded into the individual pixels. A3 comprises those pixels whose color information—per color channel—changes by a sufficiently large amount compared to their neighboring pixels. A color information limit value which can be configured by the foreground detector module 130 is provided for this rate of change.

In accordance with an alternative embodiment of the invention, it is also feasible that the acquisition of the pixels by means of the Z-value (i.e. forming the set A2) and the forming of the set A3 by means of the color information values with respect to neighboring pixels is carried out in one step. The change of the Z-values, that is to say the depth information and the color information, is in this case expressed by a joint, configurable limit.

Subsequently, the foreground detector module 130 defines an edge area around A3 as a subset of the set A2 by means of an iterative construction. In the general case, as opposed to the simple case mentioned above, this edge region is the foreground region VGB.

In the process, the iterative construction starts with a set A31, which is that subset of A2 which is adjacent to A3. As a next iteration step, the set A32 is defined, which is that subset of A2 which is adjacent to the set A31. In general, the n-th iteration step progressively generates the set A3n, which is that set of A2 which is adjacent to the set A3(n−1). In the process, the parameter n can be configured by the foreground detector module 130 so that the size (expressed in the number of pixels) of a "width" of the edge region can be set, and as a result of this it is possible to define how large the component of the foreground region VGB is intended to be with respect to the overall image 120. Thus, the foreground region VGB is clearly marked out as the edge region around A3 which becomes "wider" with every iteration step and fills up more and more of the region of the complementary set of A3 in A2.

In an example embodiment, the size of the foreground region VGB (expressed in the number of pixels) is dynamically adapted by a size (again expressed in pixels) of the 3D graphics components. It is established by means of a limit for the overall size of the 3D graphics components, configurable by the foreground detector module 130, that when the set A1 is very small (i.e. there are only few graphics components in the image 120), the set A2 is taken to be the foreground region VGB and this corresponds to the abovementioned simple case. Otherwise, the described iterative construction of the edge region from the set A2 is marked out as the foreground region VGB by means of the adjustable iteration parameter n, so that said foreground region can be kept small even if a large amount of graphics elements are present in the image 120.

In this manner, the method according to an embodiment of the invention can dynamically adapt the foreground region VGB to that pixel proportion of the image 120 which is composed of 3D graphics. All pixels which are not part of the foreground region VGB are included in the background region HGB. Subsequently, in step 230a, the pixels belonging to the foreground region VGB are copied to an image file, for example, and are compressed with a lossless, i.e. low, compression rate. The foreground region image file is now ready to be transmitted to the client 160.

The simplified image 120a is now formed in step 240 by the smoothing-module 150 smoothing the foreground region VGB in image 120, starting from the pixels of the background region HGB. In other words, the color information of the pixels of the background region HGB are extended in a continuous manner to the color information of the pixels in the foreground region VGB in the image 120.

In accordance with one embodiment of the invention, the assumption is made that the color information of the pixels to be smoothed has a harmonic profile, so that the Laplace operator is vanishing on each color channel of these pixels.

Numerically, this is a Dirichlet problem, which can be solved by a simple discretization of the Laplace operator. One possibility is to approximate the Laplace operator by $1/4(P1+P2+P3+P4)-P0$, where P0 is the color value of a pixel in the foreground region VGB, and P1 to P4 are the corresponding color values of neighboring pixels adjacent to this point.

In accordance with one embodiment, it is unnecessary to complete the smoothing step 240 and this saves time. In accordance with one embodiment of the invention, the Dirichlet problem is solved using an iterative ansatz and the iteration is simply terminated after a few steps. A multigrid method is advantageous in this case for obtaining rapid convergence. Specifying a number of hierarchy levels in the multigrid method and the number of iteration steps in each hierarchy level represent two parameters of the smoothing module 150, which can be set according to an embodiment of the invention and which can be configured. The number m of iterations per hierarchy level can be kept very small as a result of the multigrid ansatz, e.g. m=3. The smoothing by way of the multigrid method can very advantageously be implemented directly on a process of the graphics card 115 (GPGPU) because it is quick.

The simplified image 120b obtained in this manner is now compressed with a lossy, or high, compression rate in step 230d.

The foreground region VGB having a low compression rate and the simplified image 120a having a high compression rate are transmitted from the server 110 to the client 160 in step 250 in order to then be decompressed there by way of the two decompression modules 170 and 180, and to subsequently be combined by the composition module 190 in step 270 to form the original image 120. The composition module 190 in this case can be implemented on a graphics card of the client 160.

Finally, reference is made to the fact that, in principle, the description of the invention and the example embodiments are not to be understood as limiting the invention with regard to a particular physical implementation. In particular, it is obvious to a person skilled in the relevant art that the invention can be realized, as a whole or in part, using software and/or hardware and/or distributed on a number of physical products—in particular computer program products.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for compressing digital images which can be displayed by a graphics card, the method comprising:
   providing, by the graphics card, an image;
   marking out, in a single integrated step, a foreground region in the image provided, the foreground region being marked out on a basis of depth information provided by the graphics card, the depth information including z-axis information;
   compressing the marked-out foreground region;
   simplifying the image by smoothing the foreground region marked out in the image; and
   separately compressing the simplified image.

2. The method as claimed in claim 1, wherein the foreground region is additionally marked out using color information in the image.

3. The method as claimed in claim 1, wherein a size of the marked-out foreground region is dynamically adapted to at least one of the depth information and color information.

4. The method as claimed in claim 1, wherein the foreground region has a lower compression rate than the simplified image.

5. The method as claimed in claim 1, wherein at least one of the marking out of the foreground region and the compressing are parallelized.

6. The method as claimed in claim 1, wherein a multigrid method is used for the smoothing in the simplifying the image by smoothing.

7. The method as claimed in claim 1, wherein at least one of the marking out and the simplifying are implemented on the graphics card by way of at least one of a fragment shader and another hardware module.

8. The method as claimed in claim 1, further comprising:
   separate or simultaneous transmitting of the compressed foreground region and of the simplified image to a client over a communication network, wherein the transmitted foreground region and of the simplified image are separately or simultaneously decompressible at the client and wherein the decompressed foreground region and the decompressed simplified image are combinable at the client.

9. A non-transitory computer readable medium including program segments for, when executed on a computer device, causing the computer device to implement the method of claim 1.

10. A system for transmitting compressed digital images from a server to a client over a communication network, comprising:
    a graphics card to provide an image;
    a foreground detector module to mark out, in a single integrated step, a foreground region in the provided image on a basis of depth information provided by the graphics card, the depth information including z-axis information;
    a foreground region compression module to compress the marked-out foreground region;
    a smoothing module to smooth the foreground region marked out in the image to obtain a simplified image;
    a compression module to compress the simplified image;
    a transmission interface to separately or simultaneously transmit the compressed foreground region and the compressed simplified image from the server to the client.

11. A graphics card for providing digital images, comprising:
    a foreground detector module to mark out, in a single integrated step, a foreground region in a provided image on a basis of depth information provided by the graphics card, the depth information including z-axis information;
    a smoothing module to smooth the foreground region marked out in the image to obtain a simplified image so that the marked-out foreground region and the simplified image are separately compressible.

12. The method as claimed in claim 2, wherein a size of the marked-out foreground region is dynamically adapted to at least one of the depth information and color information.

13. The method as claimed in claim 2, wherein a multigrid method is used for the smoothing in the simplifying the image by smoothing.

14. The method as claimed in claim 1, wherein, if the digital images are compressed to transmit them over a communication network to a client, the method further comprises:
  separate or simultaneous transmitting of the compressed foreground region and of the simplified image to the client;
  separate or simultaneous decompressing of the transmitted foreground region and of the simplified image on the client; and
  combining the decompressed foreground region and the decompressed simplified image.

15. A method for decompressing digital images which can be displayed by a graphics card, the method comprising:
  receiving a foreground region of an image and of a simplified image over a communication network, the foreground region being marked out, in a single integrated step, of an image on a basis of depth information provided by the graphics card and compressed, and the simplified image being created by smoothing the marked out foreground region and by separate compression, the depth information including z-axis information;
  separate or simultaneous decompressing of the received compressed foreground region and of the received compressed simplified image; and
  combining the decompressed foreground region and the decompressed simplified image.

16. A non-transitory computer readable medium including program segments for, when executed on a computer device, causing the computer device to implement the method of claim 15.

17. A system for receiving and decompressing digital images which can be displayed by a graphics card, the system comprising:
  a receiver interface to receive a foreground region of an image and of a simplified image over a communication network, the foreground region being marked out, in a single integrated step, of an image on a basis of depth information provided by the graphics card and compressed, the depth information including z-axis information and the simplified image being created by smoothing the marked out foreground region and by separate compression;
  a decompression module for respective separate or simultaneous decompression of the received compressed foreground region and the received compressed simplified image; and
  a composition module to combine the decompressed foreground region and the decompressed simplified image for display.

* * * * *